(12) United States Patent
Halvarsson

(10) Patent No.: US 6,330,664 B1
(45) Date of Patent: Dec. 11, 2001

(54) METHOD RELATING TO HANDLING OF CONDITIONAL JUMPS IN A MULTI-STAGE PIPELINE ARRANGEMENT

(75) Inventor: Dan Halvarsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/185,194

(22) Filed: Nov. 3, 1998

Related U.S. Application Data

(63) Continuation of application No. PCT/SE97/00744, filed on May 2, 1997.

(30) Foreign Application Priority Data

May 3, 1996 (SE) .................................................. 9601685

(51) Int. Cl.[7] .............................. G06F 9/30; G06F 9/32; G06F 9/38
(52) U.S. Cl. .......................... 712/239; 712/237; 712/238; 712/211; 711/135; 711/123; 711/204
(58) Field of Search .................................. 712/206, 207, 712/212, 214, 215, 232, 235, 236, 238, 239, 23, 237, 240, 233, 234, 223, 211, 245, 217, 228, 213; 711/123, 125, 135, 204

(56) References Cited

U.S. PATENT DOCUMENTS

| | | | |
|---|---|---|---|
| 4,974,155 | 11/1990 | Dulong et al. ........................ | 712/219 |
| 5,101,341 | * 3/1992 | Circello et al. ........................ | 712/213 |
| 5,131,086 | * 7/1992 | Circello et al. ........................ | 712/213 |
| 5,212,779 | * 5/1993 | Saito ..................................... | 712/244 |
| 5,287,467 | 2/1994 | Blaner et al. ........................... | 712/4 |
| 5,317,700 | 5/1994 | Hammitt et al. ....................... | 712/240 |
| 5,327,536 | 7/1994 | Suzuki et al. .......................... | 712/238 |
| 5,442,756 | 8/1995 | Grochowski et al. ................. | 712/238 |
| 5,598,546 | * 1/1997 | Blomgren ............................. | 712/209 |
| 5,655,097 | * 8/1997 | Witt et al. ............................. | 712/204 |
| 5,692,170 | * 11/1997 | Isaman ................................. | 712/244 |
| 5,758,142 | * 5/1998 | McFarling ............................ | 712/239 |
| 5,815,698 | * 9/1998 | Holmann et al. ..................... | 712/237 |
| 5,949,995 | * 9/1999 | Freeman .............................. | 712/239 |
| 6,055,630 | * 4/2000 | D'Sa et al. ........................... | 712/240 |

FOREIGN PATENT DOCUMENTS 023 9081    9/1987  (EP) .
WO 97/42567 * 11/1997 (WO) .

* cited by examiner

Primary Examiner—Daniel H. Pan
(74) Attorney, Agent, or Firm—Burns, Doane, Swecker & Mathis, L.L.P.

(57) ABSTRACT

An arrangement and a method provide instruction processing. Instructions are delivered to a multi-stage pipeline arrangement from at least one instruction source. A storing arrangement stores jump address information for jump instructions. The storing arrangement includes at least one FIFO-register. The conditional jump target address information is stored in the FIFO-register while at least the jump instructions are stored in the pipeline arrangement. The jump target address information is delivered from the FIFO-register in such a way that substantially sequential and continuous prefetching of the instructions is enabled irrespective of the number of conditional jumps and irrespective of whether the jumps are taken or not.

28 Claims, 4 Drawing Sheets

METHOD RELATING TO HANDLING OF CONDITIONAL JUMPS IN A MULTI-STAGE PIPELINE ARRANGEMENT

This application is a continuation of International Application No. PCT/SE97/00744 filed on May, 2, 1997, now International Patent WO97/42567, which designates the United States.

TECHNICAL FIELD

The present invention relates to processing of instructions using a pipeline technique. Particularly the invention relates to an arrangement and a method respectively for processing of instructions in a multi stage pipeline arrangement. The invention also relates to a telecommunications system comprising processors or particularly central processors in which pipeline processing is applied.

BACKGROUND

Usually, the processing of one instruction requires a number of different steps to be gone through. Moreover, the execution must go through the steps in sequence. In a pipeline processor comprising a number of stages, different hardware is responsible for the different tasks as assigned by the stages. When instructions are executed in succession, the pipeline is filled from clock-cycle to clock-cycle. The performance is considerably increased by the pipeline technique because of the much higher clock frequency if the instructions follow sequentially. However, if jump instructions occur when another instruction is executed, the flow through the pipeline is interrupted because the address of the following instruction that is to be processed can only be ascertained during the decoding phase. However, in many known systems and in many applications, the jump instructions are quite common and represent a relatively high percentage of the number of instructions, in some cases, e.g. about 20%. The increase in performance strived at through applying the pipeline technique can then be severely affected.

In U.S. Pat. No. 4,974,155 a pipeline computer is illustrated. To avoid the loss of time that occurs when the process is blocked due to jump instructions, variable delay branch operations are applied which accommodates programming of conditional as well as unconditional branch operations. When program instructions are provided for execution, steps are implemented to accommodate a branch command followed by a split command to indicate the time for the jump. A split command may for example comprise a bit in an instruction command in the execution of a branch. This means that a jump is not executed directly after the branch command but it is delayed through a number of program instructions pending a split command in the form of a split bit. The number is variable and can be controlled by the programmer and the delay must be at least one cycle. When a conditional branch is specified by a control instruction, the results of subsequent processing are tested until the condition codes are ready and a split bit occurs. If the condition is not met, no jump is taken but execution is resumed of the current sequence in the program counter. Thus, in the case of a branch command, the system provides for a variable delay during which branch or target instructions are fetched and when a split bit occurs, a jump can be done promptly.

However, conditional jumps are not handled in a satisfactory manner since the losses in time due to the delay etc. are considerable and there is still a risk of pipeline break when there are several substantially consecutive jump instructions and moreover, the arrangement is based on branching and preconditions.

Moreover, the arrangement as disclosed in the above-mentioned document, apart from not being sufficiently efficient in saving time, is complicated.

U.S. Pat. No. 5,287,467 describes an arrangement, which uses branch instruction detection from the execution pipelines to enhance the parallelism of multi-pipelined computers. Up to two of the detected instructions are processed concurrently parallel with the operation of the executions pipelines. The branch condition processing consists of detection of a branch instruction in the current instruction stream, predicting whether or not the branch is taken, prefetching the instruction text for a branch which is predicted as being taken, performing the branch test inherent in the branch instruction and issuing a corrected instruction refetch, if necessary. Then the branch instruction location information is used to generate the address of the branch instruction in a cache memory. Then a branch target address is generated, and the branch instruction text, its address and a prefetch indicator are entered into a branch queue, which is operated as a FIFO queue.

This arrangement mainly considers a Scalable Compound Instruction-Set Machines (SCISM) using branch prediction mechanism. If the prediction outcome of a branch prediction is that the branch is not taken, instruction fetching proceeds with the normal fashion. Moreover, entire branch instruction, including the branch address is stored in the FIFO, which requires larger memory units. In case of a misprediction, the correct instruction must again be fetched into the decode stage of the execution pipeline. To obtain an optimum branch prediction and thereby an optimum arrangement, a complicated logic unit is required, which complicates the arrangement.

A known processor comprising a three-stage pipeline comprises the stages of fetching instructions, decoding instructions and executing or carrying out instructions. Once the pipeline is filled there will be a number of instructions in different steps and there is an output of the finished instruction every cycle in case the instructions take, e.g. one micro-cycle if not in a pipelined system. If the speed of the processor for example would be increased or even doubled, the output would also be doubled. However, in practice the pipeline is broken as soon as the instruction flow is non-sequential, i.e. if there is a jump in the instruction code. Therefore, in the end of the pipe there are two pipelines, in order to hide the effects resulting from jumps in the instruction code, to a micro-control unit or a micro-processor unit. One pipeline follows the program flow sequentially and the other pipeline is started as soon as a conditional jump is found in the instruction queue. The second pipeline, i.e. the non-sequential pipeline, assumes that the detected jump will be taken and therefore fetches and decodes the instructions from the jump address and onwards.

If however there were one more conditional jump in the sequential queue, the prefetching of instructions would have to be stopped and even if the jumps were not taken, it would be impossible to keep the sequential pipeline filled. Thus there is a stop or a pipeline break when the second conditional jump is found resulting in a loss of time.

SUMMARY

One of the objects of the present invention is to provide an arrangement for instruction processing on assembler level and/or micro-code level which has a high capacity. Instructions or processing of instructions is in the present application taken to mean processing of assembler instructions as well as processing of micro code that is either initiated by an assembler instruction or used in micro code only processors. It is also an object of the invention to provide an arrangement in which a higher proportion of the available bandwidth is used for executing as compared to in hitherto known arrangements, i.e. that the time losses, e.g. due to pipeline break etc. are reduced and that jump instructions to a lower extent affect the execution efficiency. A particular object of the invention relates to fulfilling the above-mentioned objects under circumstances wherein very large memories are used and wherein a high number of jobs are to be carried out, i.e. a high processing frequency wherein further the requirements as to reliability are high. One example thereon relates to central processors in telecommunication systems in which for example a CPU (central processor unit) controls for example 100,000 subscribers. In this cases the requirements generally differ from those of commercial computers and the executing efficiency is of the utmost importance and the bandwidth needs to be exploited as much as possible.

The invention also has as an object to provide a method for processing instructions which fulfils one or more of the abovementioned objects. Still further it is an object to provide a telecommunications system with a central processing arrangement and central processing arrangements for a telecommunication system respectively which fulfil one or more of the abovementioned objects.

Therefore an arrangement for instruction processing is provided which comprises a multi-stage pipeline arrangement. Instructions are delivered from at least one instruction source. Instructions are arranged in an instruction queue and conditional jump target addresses are stored in a first-in-first-out storing arrangement, while at least the jump instructions are stored in a pipeline arrangement. The jump target address information is delivered from FIFO-register, in such a way that substantially sequential and continuous prefetching of the instructions is enabled irrespective of the number of conditional jumps, irrespective of whether the jumps are taken or not and irrespective of the type of the instructions.

In a particular embodiment an arrangement is provided in which instructions are delivered sequentially from one or more instruction sources such as for example a program store to a pipeline arrangement comprising a number of stages. In an advantageous embodiment a part of the pipeline comprises at least a first and a second pipeline path of which one is current executing instructions while the other is a non-current path filling up its instruction queue. A storing arrangement is provided for storing at least conditional jump address information. The storing arrangement comprises at least one first-in-first-out register (FIFO). The pipeline path, if there are two at least partly, then the one which is non-current, consecutively prefetches instructions from the storing means, FIFO, in which jump address information of some kind is stored, e.g. the jump target addresses. When a conditional jump is taken, the pipeline paths are switched so that the non-current becomes current and vice versa and then the previously current pipeline path becomes non-current and proceeds the consecutive prefetching of instructions from the addresses or via the address information as stored in the storing means. Substantially continuous prefetching of instructions is enabled irrespective of the number of conditional jumps and irrespective of whether the jumps are taken or not. The number of FIFO-registers can, but does not have to, be the same as the number of pipeline paths. However, in an advantageous embodiment there are two pipeline paths and one FIFO-register arranged for each path. In a particular embodiment using jump prediction, there are provided a first and a second FIFO-register for each pipeline path.

The number of positions in the FIFO-registers can be different but according to an advantageous embodiment the number of positions in each FIFO-register corresponds to the maximum number of instructions in the pipeline path. However, this is not necessary, the number of positions in each FIFO-register can also be lower than the number of instructions that can be in the respective pipeline path. For example each FIFO-register may comprise 2–4 positions for storing jump address information or particularly jump target address information. However, according to the invention there are no restrictions relating thereto, but it can be applied depending on the system, application etc. In one embodiment about 8 instructions can be queued in each pipeline path.

Advantageously one of the pipeline paths is a sequential path, i.e. it follows the program flow sequentially so that when a second conditional jump instruction is found, jump address information, particularly the jump target address, is stored in the FIFO-register of the sequential path (if there is a register arranged to each pipeline path). If the jump is not taken, the instructions of the sequential queue are executed substantially without any interruption and the non-current (e.g. non-sequential) pipeline path prefetches instructions using the consecutive address information of the first FIFO-register or the FIFO-register of the sequential path. Of course the operation is similar if the non-sequential pipeline path currently acts as the current pipeline path. Advantageously, through a FIFO-register arranged to the non-sequential path the prefetching of instructions is not interrupted from a conditional jump instruction. If a conditional jump on the other hand is not taken, the non-current path is flushed and the prefetching to the non-current path starts using the next address stored in a FIFO-register of the storing arrangement.

Advantageously prefetching to a pipeline path can be done using both address information from a FIFO-register arranged to that particular path and from a FIFO-register arranged to another or the other pipeline path. Thus in the sequential as well as in the non-sequential pipeline it is possible to continue fetching instructions if a conditional jump instructions is found or particularly the second or higher is found. Advantageously the processing of instructions at least comprises fetching, decoding and execution of instructions. This, however, by no means excludes other alternatives, i.e. fewer stages, more stages or other stages in any combination.

In a particular embodiment jump prediction is applied. Advantageously are then two storing means, e.g. FIFO-registers arranged to each pipeline path, e.g. a first and a second FIFO-register, the second registers, e.g. comprising a copy of the first one having the contents corresponding to what would have been in the first one without branch prediction. In the first FIFOs is advantageously jump target address information of jumps predicted to be taken stored whereas in the second FIFO-registers jump target address information is stored irrespectively of whether predicted to be taken or not so that if a jump predicted not to be taken actually is taken, then prefetching can be done from the second FIFO-register.

The jump target address information can, irrespectively of which of the above-mentioned embodiments, comprise absolute addresses but the address information may also comprise relative address information. In that case means are provided for storing the real address information or the absolute addresses.

In an alternative embodiment the pipeline arrangement comprises but one pipeline path. The address information that is output from the FIFO is used for accessing the instruction source(s), e.g. the program store.

If particularly a conditional jump actually is taken, the output address is used (for accessing, e.g. the program store) and both the FIFO and the pipeline path are flushed. If however a conditional jump is not taken, the output of the FIFO is shifted to the next address. The implementation of the FIFO can, e.g. be as described above under reference to the multi-path embodiments.

Unconditional jump instructions can according to the present invention be dealt with, in different ways, the main purpose of the prevent invention being to deal with conditional jump instructions. However, in a particular embodiment of the invention comprising two pipeline paths, for unconditional jump instructions, the pipeline paths are not switched but the flow is broken and it is proceeded from the preceding jump address. This relates to an advantageous embodiment. However, alternatively, for unconditional jumps, the paths can be switched.

Under reference to the different embodiments of the present invention comprising more than one path there can be separate decoders, e.g. one for each pipeline path but there can also be one common decoder for a number of pipeline paths. Having, one decoding arrangement for each pipeline path is however particularly advantageous.

The invention also provides for a central processor of a telecommunications system in which the multistage pipeline processing arrangement comprises one or more of the above-mentioned characteristics. The application of the invention to or relating to telecommunication systems have been found very advantageous, e.g. due to the large amounts of information required to be handled in a reliable way in such systems and the high requirements as to execution speed.

In a particular embodiment a method for pipeline processing of instructions is provided. The instructions are delivered to a decoder and the instructions are separated from conditional jump target addresses corresponding to instructions.

The instructions (without jump target addresses) are arranged in a pipelined instruction queue and the conditional jump target addresses are stored in a first-in-first-out storing arrangement. If a conditional jump is taken, the address output from the FIFO is used as the next instruction address. Then the FIFO and the instruction queue are both flushed. If a conditional jump is not taken, the FIFO shifts to the next address.

Particularly a method for processing instructions in the pipeline in a processing arrangement comprising at least in a part of the pipeline two pipeline paths, is provided, the method comprising the steps of:

Executing instructions in a current path storing conditional jump address information in a storing arrangement, advantageously in a FIFO-register arranged to the current path. In a non-current path, prefetching instructions from addresses as given in the storing arrangement, particularly a fifo-register, e.g. arranged to the other pipeline path, i.e. the current path. If a jump is not taken, the non-current path is flushed and the prefetching of instructions proceeds from the next address as given in the storing arrangement or particularly the FIFO-register of the current path. If on the other hand a conditional jump is taken, a current path is switched into a non-current path and vice versa and the previously current path is flushed and prefetching commences to that path instead, i.e. from the address as given in the storing means arranged to the other pipeline path which now becomes the current path.

It is an advantage of the invention that conditional jump instructions do not result in pipeline breaks or particularly if more than one jump is found this does not lead to interruptions, both in an embodiment comprising one path as well as in the other embodiments in which case it does not lead to interruptions in the sequential queue and that the prefetching to a non-sequential pipeline also will be interrupted as was the case in hitherto known arrangements. It is also an advantage of the present invention that pipeline processing arrangements can be provided which can be adapted to different needs in that the execution efficiency can be increased in an easy and, as compared to known systems, non-complicated and non-complex manner. It is also an advantage that the execution efficiency can be increased and in that the invention can be applied irrespectively of whether branch prediction is used or not; if branch prediction is applied a modification as compared to the non-prediction case is advantageously provided for as discussed in the foregoing.

BRIEF DESCRIPTION OF THE DRAWINGS

The invention will in the following be further described in non-limiting way under reference to the accompanying drawings in which.

DETAILED DESCRIPTION

Figure 1:
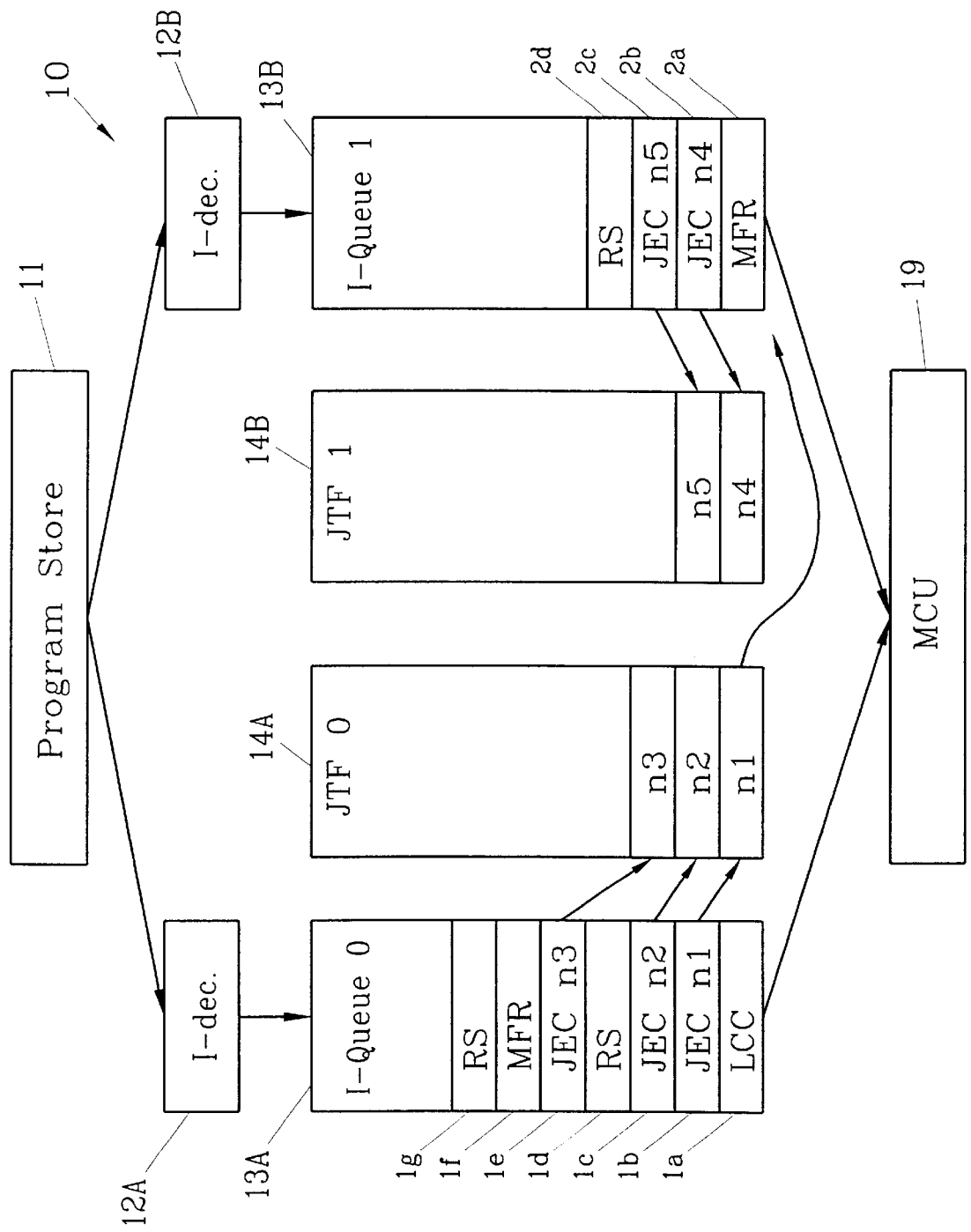
FIG. 1 schematically illustrates an embodiment of the invention comprising two pipeline paths wherein one FIFO-register is arranged to each a pipeline path.

FIG. 1 shows a first embodiment of the present invention. Instructions are delivered sequentially from an instruction source which in the shown embodiment is a program store (PS) 11. Instructions can also be delivered from other instruction sources or from more than one instruction source, internal or external sources etc. As relates to the fetching stage, instructions can thus be fetched from an internal or an external memory as given by the address. In the shown embodiment there are two instruction decoding means 12A, 12B, one for each pipeline path 13A, 13B. In alternative embodiments there is just one decoding means which either can be the case in an embodiment where there is just one pipeline path as discussed below referring to an alternative embodiment or in embodiments where there are more than one pipeline path but the decoding means are common for at least two of the pipeline paths. In a decoding stage the needed operands are fetched from an internal or an external memory. The instruction to be processed is decoded and data generated by an earlier instruction are advantageously accessible for the current instruction. The arrangement of FIG. 1 comprises two pipeline paths 13A, 13B at least in the end of a pipeline. Alternatively an entire pipeline may contain two pipeline paths or the pipeline paths can be elsewhere in the pipeline, e.g. in the beginning thereof or in any intermediate position. Due to that the effects of pipeline jumps instructions are concealed for the micro control unit 19.

It is here supposed that the first pipeline path 13A, (I-Queue O) follows the program flow sequentially and the second pipeline path 13B (I-Queue I) is started when a jump is detected in the instruction code of the sequential pipeline path 13A. The second non-sequential pipeline path 13B assumes that a conditional jump will be taken and therefore it fetches and decodes the instructions from the jump address and onwards. In the sequential "first" pipeline path 13A a number of instructions 1a–1g are stored in an instruction queue (I-queue O). The first instruction 1a of the queue is here a load constant instruction (LCC). The second instruction 1b is however a conditional jump instruction, here the first conditional jump instruction n1 and denoted jump if equal to n1, JEC n1. In a similar manner instruction 1c is the second conditional jump instruction jump if equal to n2, JEC n2 and the next instruction 1d is an instruction to read from the store, read store (RS). The instruction 1e is again a conditional jump instruction JEC n3. The instruction 1f is an instruction to move from the resister MFR and instruction 1d again is an instruction to read in the store RS. To the, in this case, sequential, first pipeline path 13A a first-in-first-out FIFO-register 14A is arranged in which the jump target addresses of the conditional jumps n1, n2, n3 are stored. In this case the FIFO-register is denoted a jump target FIFO JTF O since it is the jump target addresses that are stored therein. In one embodiment the absolute addresses can be stored in the FIFO 14A or alternatively (not shown here) relative address information can be stored therein. In the latter case additional storing means are provided for storing the absolute addresses. What is important however is that some kind of address information is stored in a first in first out type of storage.

Through storing address information relating to the jump addresses, it is possible to continue executing instructions in the sequential queue without interruptions when one or more conditional jumps have been detected but not taken. To non-sequential pipeline path 13B a (second) first-in-first-out register 14B (JTF 1) is arranged in which are stored jump target addresses (of course the same argumentation relating to address information is also relevant for this storing means as well as for the instructions 2a–2d of the instruction queue in the second path 13B). The instructions in the second pipeline path 13B are: the first instruction move from register (MFR) 2a is followed by two conditional jump instructions 2b,2c, herein denoted JEC n4 and JEC n5 respectively and instruction 2d is an instruction to read in store RS. Thus it is also in the non-sequential (here) pipe possible to continue to fetch instruction if one or more conditional jump instructions are found.

Now the case as particularly illustrated by FIG. 1 will be more thoroughly explained. It is assumed that the first pipeline path 13A for the moment is the current path. The pipeline path 13A then delivers instructions to the micro control unit 19 while the (second) pipeline path 13B fills up an instruction queue. In the particular instant illustrated the second pipeline path 13B prefetches instructions from the address n1 stored in the FIFO-register 14A arranged to first pipeline path 13A. These instructions will be executed if the conditional jump to n1 is taken. If however the jump is not taken, the second pipeline path 13B is flushed and prefetching from address n2 is started instead. If then for example the jump to n2 is also not taken, prefetching will be done from n3 instead etc.

If however the first jump to n1 is taken, the pipeline paths 13A and 13B are switched and the previously current path 13A becomes non-current whereas the previously non-current path 13B becomes current. Thus pipeline path 13A is flushed and prefetching to this path from address n4 as stored in the second FIFO-register 14B arranged to the second pipeline path 13B is initiated. The prefetching is done from the address n4 in the program store 11 in this case. If there had not been any storing means 14A, 14B, the prefetching, in path 13A would have had to be stopped upon detection of the second jump instruction 1c, i.e. jump instruction JEC n2 and for the second pipeline path 13B the prefetching would have had to be stopped after detection of the first jump instruction 2b, i.e. jump instruction JEC n4.

In the illustrated embodiment the number of FIFO-registers corresponds to the number of pipeline paths. In an alternative embodiment however (not illustrated) common storing means could have been used for two or more pipeline paths. More than one FIFO-register arranged to each pipeline path will be more thoroughly discussed under reference to FIG. 2. However, the invention also applies to the case when there is just one pipeline path and a FIFO-register arranged thereto which will be further discussed below. In one embodiment the number of positions in each FIFO-register corresponds to the number of instructions in the corresponding pipeline paths. The number of instructions in a pipeline path depend on application, system etc.; for example one pipeline path may comprise 8 instructions but it can also comprise fewer as well as more, the FIG. 8 merely being given for illustrative purposes.

In another embodiment the number of positions in each FIFO-register is lower than the number of instructions in the corresponding pipeline paths. For example there could be 2, 3 or 4 positions in each FIFO-register. Of course there could also be more, e.g. there merely being a slight difference between the number of instructions in a pipeline path and the corresponding storing means. This as referred to above depends on the application, needs and requirements etc.

Through the introduction of the storing means the used average cycle time per instruction is reduced. The amount to which it is reduced however also depend on a number of different parameters like clock speed, access time on memories, number of instruction decoders etc.

Figure 2:
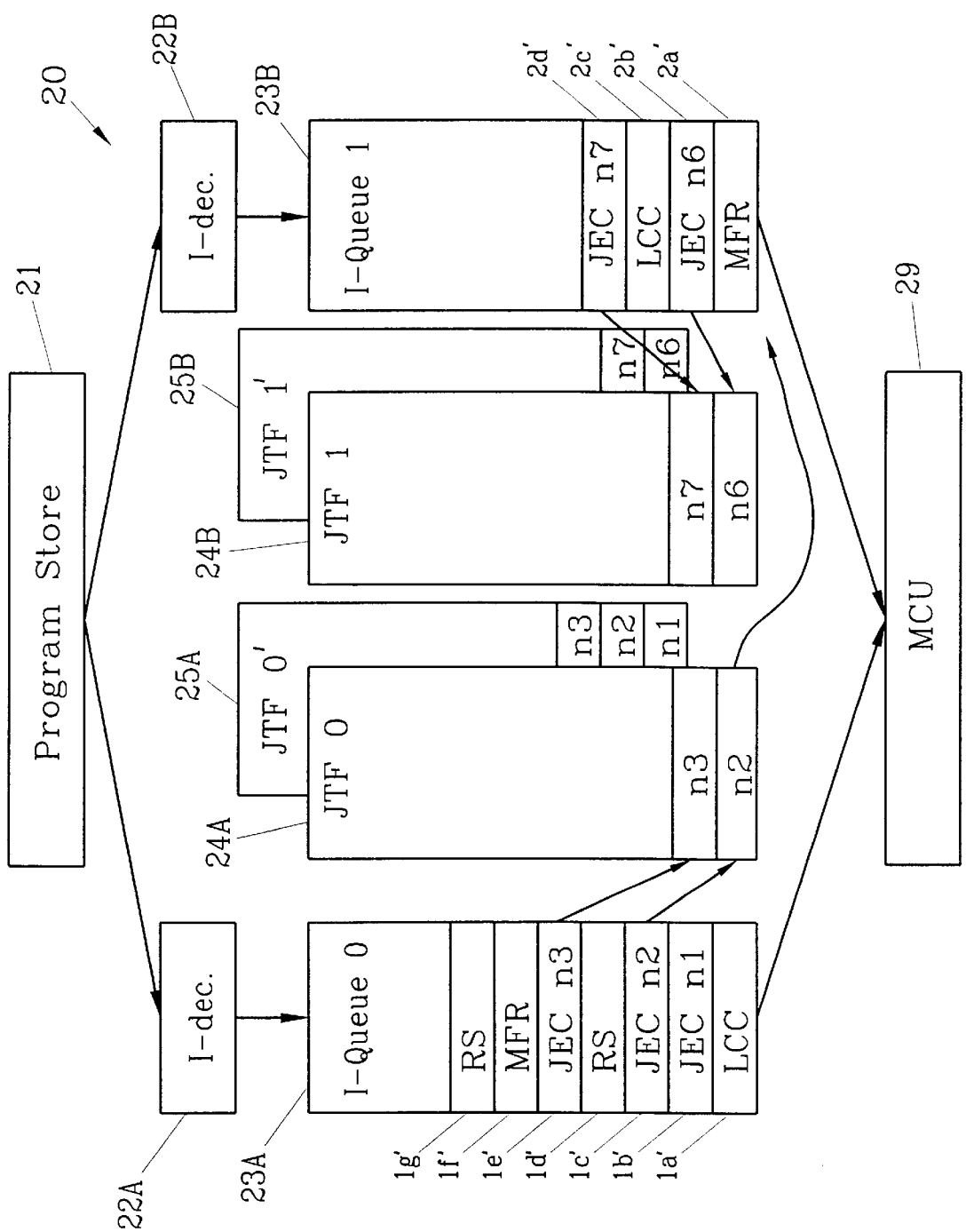
FIG. 2 illustrates another embodiment of the invention applying branch prediction, FIG. 3 schematically illustrates an embodiment with just one pipeline path.

FIG. 2 illustrates an embodiment using branch prediction together with duplicated storing means for each pipeline path. Thus the function already provided for through FIG. 1 is provided and can. e.g. be arranged to still further increase the execution efficiency. In brief this means that if a jump is predicted not to be taken, it should not be prefetched in the non-current path. Instead the next detected jump that is predicted to be taken should be prefetched. If however the situation occurs that the first mentioned jump, i.e. the one not predicted to be taken, after all should be taken, which however is normally not the case, a copy of the storing means or the FIFO-register is provided in which all conditional jump target addresses (or more generally, address information) is comprised, i.e. an additional FIFO-register having a content that corresponds to the content as it would have been without branch prediction. Then prefetch can be ordered from there instead.

Now a more thorough explanation of the embodiment as illustrated in FIG. 2 will be given.

Similar to FIG. 1 instructions are delivered sequentially from program store PS 21 to a first pipeline path 23A and a second pipeline is also arranged 23B to each of which paths separate decoder means 22A, 22B are arranged. Like the embodiment illustrated in FIG. 1, the instructions can be delivered from more than one instruction source, it may comprise external or internal memories etc. Furthermore the decoding means can be common for more than one pipeline path or there can be one for each as shown in FIG. 2. In the first pipeline path 23A a number of instructions 1a'–1g' are arranged in a queue; the denotations are similar to the ones of FIG 1. In the same manner a number of instructions 2a'–2d' are arranged in a queue in the second pipeline path 23B. To each pipeline path 23A, 23B a FIFO-register 24A, 24B is arranged. However, in addition thereto a "shadow" or an additional or duplicated FIFO-register (JTF 0';JTF 1') is arranged to each of the pipeline paths 25A, 25B.

In FIG. 2 it is supposed that the first pipeline path 23A momentarily is current. This means that the first pipeline path 23A delivers instructions to the MCU 29. Then the second pipeline path 23B fills an instruction queue. In this very moment the first pipeline path 23A prefetches instructions from address n2 in the first FIFO-register 24A arranged to the pipeline path 23A. In FIFO-register 24A are thus the addresses of the instructions predicted to be taken stored. The instructions from address n2 will be executed if the conditional jump to n1 is not taken and the conditional jump to n9 is taken. Here was thus the jump n1 from the pipeline path 23A considered as not likely to be taken, i.e. not predicted to be taken. If however the jump n1 from path 23A despite that is taken, the second pipeline path 23B is flushed and the address of the second, also denoted shadow, FIFO-register 25A contains the right address. Prefetching from address n1 is then started instead. Then the paths are switched and the second pipeline path 23B will be current and the first pipeline path 23A is flushed and prefetch to this path from address n6 in the program store 21 will start if this jump is predicted to be taken. The embodiment as illustrated through FIG. 2 can of course also be varied in a number of way, the discussions evaluated above under reference to FIG. 1 of course also apply in this case, e.g. relating, to the number of positions in the FIFO-registers, the number of instructions that can be queued in a path etc. The address information contained in the FIFO-registers can of course also be absolute addresses, relative addresses etc.

As far as unconditional jumps are concerned, in an advantageous embodiment there is no change of paths when an unconditional jump is detected. Instead the flow is interrupted and it is proceeded from the jump address and onwards. However, the invention is not limited thereto; it is also possible to switch the paths when an unconditional jump is detected. In general unconditional jumps can be dealt with in any convenient manner.

The invention also relates to a telecommunications system in which the central processors or at least a number thereof, comprise pipeline processing arrangements as discussed above. The central processor as, e.g. referred to in telecommunication system such as for example the AXE-system by Ericsson comprise very large memories. For example a central processing unit (CPU) of an exchange may have to handle, e.g. 100,000 subscribers. In some cases there may be about 100 million instructions per second and the bandwidth needs to be used as efficiently as possible and there is a strong desire to reduce the lost time as much as possible so that breaks etc. will not occupy too much bandwidth. The invention can also be used in, e.g. base stations of mobile telecommunications systems.

However, the invention can advantageously be applied in any systems applying real time control and for which the requirements as to a high reliability are high. What actually is to be prefetched is, e.g. given by an algorithm or criteria. A selection may also be done relating to what is to be prefetched etc.

Figure 3:
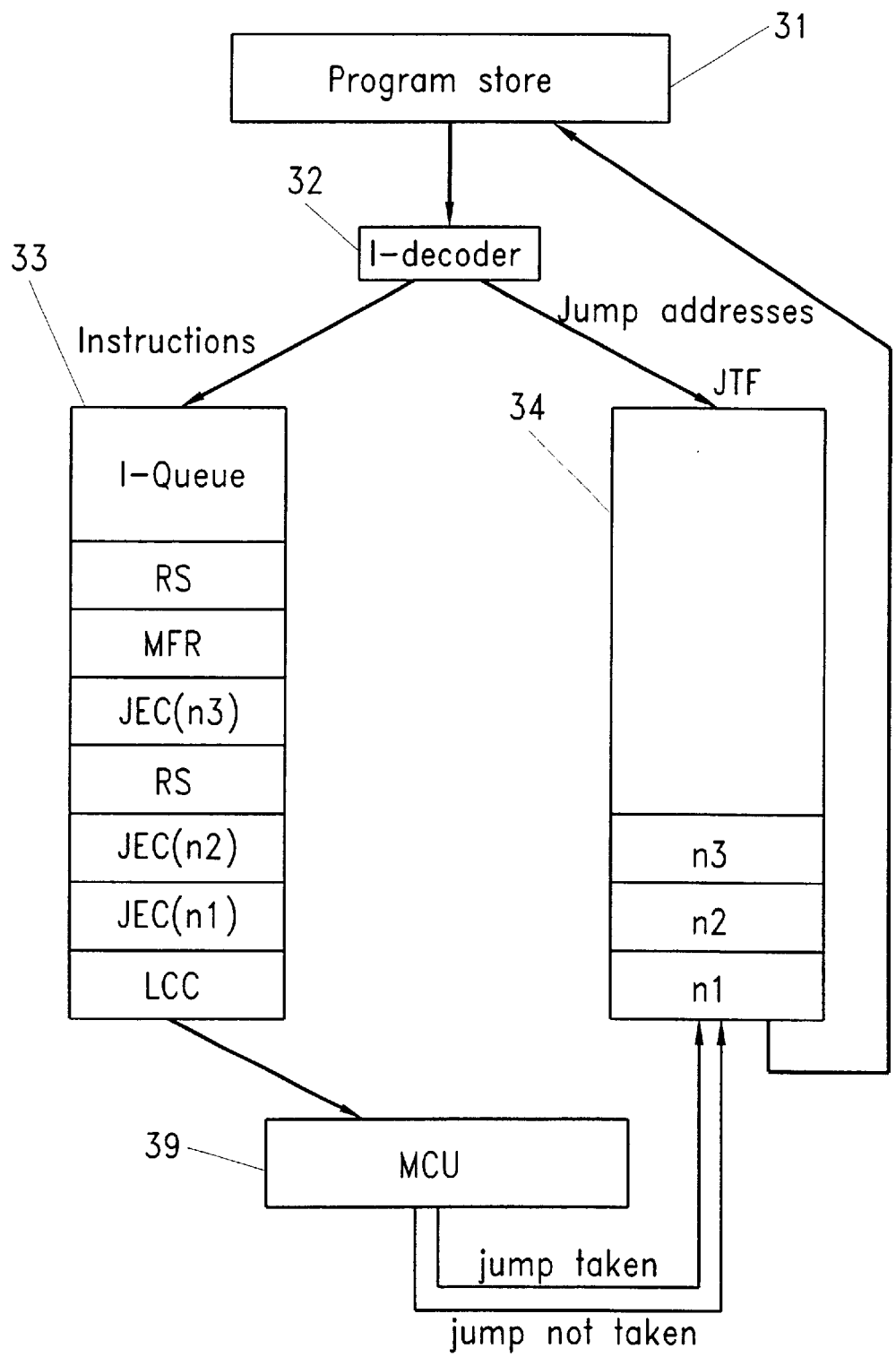

FIG. 3 illustrates an embodiment with but one path 33. A jump target FIFO 34 storing jump target addresses is according to the invention used when for one reason or another it is not desirable to send the jump target addresses along with the instruction. This will be further discussed below.

Instructions are delivered from, e.g. a program store 31 to a decoder 32. Instead of delivering the jump target addresses together with the instructions they are put into the jump target FIFO 34. The instructions are arranged in the instruction queue 33, i.e. the pipeline path, in a manner similar to the ones described in the foregoing. However, the jump target addresses are not included as can be the case in the multi-path embodiments. MCU 39 denotes the micro control unit as above. The output of the FIFO 34 is the jump target address that are first put in the FIFO 34. If the jump corresponding thereto is not taken, the output of the FIFO 34 is shifted to the next address in the FIFO, i.e. here n2.

If however the jump is taken, the output, e.g. here n1, is used as address to the next instruction. Then the FIFO 34 and the instruction path 33 are flushed.

A jump target FIFO can advantageously be used with a micro flow handler. A micro flow handler is used when an assembler instruction requires more than one micro word. Also, in this case are breaks in the flow disadvantageous and costly.

Furthermore it is convenient when it is found appropriate to separate jump instructions from the instructions creating the jump condition. A particular application relates to the case when a branch address is sent to the FIFO and the instructions are delivered from an unroll function. Some functions which would normally require time-consuming loops are instead handled by an unroll function. The number of instructions sent during an unroll session can be programmed and some parameters such as, e.g. register addresses can be incremented automatically between the delivery of instructions from the unroll function. During the programming of the unroll function, a branch address is also delivered and stored in a jump target FIFO.

A jump to said address is done if a branch condition is met; it may, e.g. be that a special storing or a value is found. If the string or value is not met, the instruction following the load unroll will be executed after the requested number is delivered and executed.

Through the use of a jump target FIFO the address must in this case only be provided once and the micro-code does not have to contain as many bits as would otherwise have been necessary.

Figure 4:
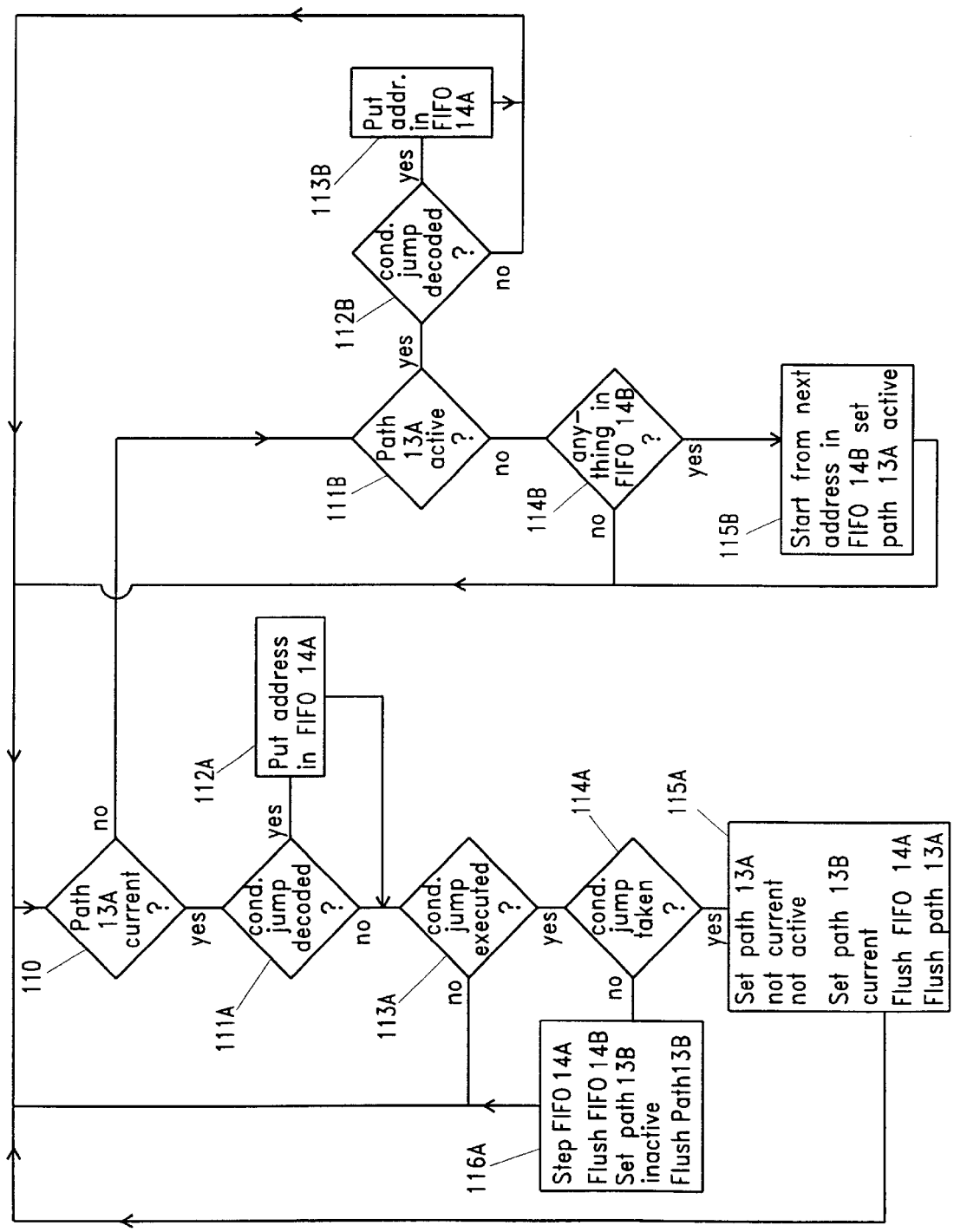
FIG. 4 is a flow diagram describing one way of processing instructions according to the invention.

In FIG. 4 a flow diagram, e.g. relating to the embodiment as illustrated by FIG. 1 is given which illustrates the flow of the control function for path 13A. The flow for the second path 13B is similar.

It is first decided if path 13A is current 110 (as referred to above current here means that it delivers instructions to the micro control unit (MCU) 19). If path 13A is current, it is examined if a conditional jump instruction is decoded, 111A. If yes, the address of the conditional jump instruction is put in the FIFO-register 14A arranged to the pipeline path 13A, 112A. Then, in the same way as if no conditional jump instruction was decoded, it is examined whether a conditional jump is executed, 113A.

If not, the procedure recommences and it is examined if path 13A is current, 110 etc. If on the other hand a conditional jump is executed, it is examined if a conditional jump was taken, 114A. If yes, path 13A is set non-current and non-active, 115A. Active means that the path gets instructions from the program store. Furthermore path 13B is set current and FIFO 14A and path 13A are flushed. If no conditional jump was taken, however, then FIFO 14A is stepped and FIFO 14B is flushed. Furthermore path 13B is set inactive and path 13B is flushed 116A. The procedure then recommences with examining if path 13A is current, 110A etc. as above.

If on the other hand it had been detected, cf. 110, that path 13A is not current, the procedure is as follows. It is examined if path 13A is active, 111B. If it is not, it is examined if there is anything in the FIFO 14B arranged to path 13B, 114B. If not, the procedure proceeds with examining if path 13A is current, 110 etc. If yes, the execution starts from the next address in FIFO 14B and path 13A is set active, 115B. Then is examined if path 13A is current, 110 etc. as discussed above.

If however it is established that path 13A is active in 111B, it is examined if a conditional jump instruction was decoded, 112B. If yes, the address of the conditional jump instruction is put in FIFO 14A. If there was not decoded a conditional jump instruction, 112B, it is again recommenced with examinating if path 13A is current 110, etc.

The invention is not limited the shown embodiments but can be varied in a number of ways without departing from the scope of the appended claims and the arrangement and the method can be implemented in various ways depending on application, functional units, needs and requirements etc.

What is claimed is:

1. Arrangement for instruction processing comprising a multi-stage pipeline arrangement to which instructions are delivered from at least one instruction source and a storing arrangement for storing jump address information for jump instructions, wherein the storing arrangement comprises at least one FIFO-register and conditional jump target address information is stored in said at least one FIFO-register while at least the jump instructions are stored in said pipeline arrangement whereby the conditional jump target address information is delivered from said at least one FIFO-register, and said pipeline arrangement comprises at least a first pipeline path and a second pipeline path, one of which being current executing instructions and the other a non-current pipeline, so arranged that when a conditional jump is taken, the pipeline paths are switched so that the non-current pipeline path becomes current and vice versa in such a way that continuous prefetching of the instructions is enabled irrespective of a number of conditional jumps and irrespective of whether the conditional jumps are taken or not.

2. The arrangement of claim 1, wherein the prefetch is substantially sequential.

3. The arrangement of claim 1, wherein one of said first and second pipeline paths is arranged for current executing instructions and the other one for filling up an instruction queue.

4. The arrangement of claim 3, wherein the non-current pipeline path consecutively prefetches instructions from jump-target addresses stored in the FIFO(s).

5. The arrangement of claim 1, wherein the storing arrangement includes a number of FIFO-registers and the pipeline arrangement includes an equal number of pipeline paths.

6. The arrangement of claim 1, wherein there are two pipeline paths and one FIFO-register arranged to each pipeline path.

7. The arrangement of claim 1, wherein a first and a second FIFO-register are provided for each pipeline path.

8. The arrangement of claim 7, wherein jump prediction is applied and in the first FIFO the conditional jump target address information of jumps predicted to be taken is stored and where the second FIFO-register conditional jump target address information is stored irrespectively of whether predicted to be taken or not so that if a jump predicted not be taken is taken, prefetch is ordered from the second FIFO-register.

9. The arrangement of claim 1, wherein each FIFO-register includes a position that corresponds to each instruction that can be provided in each instruction queue of each pipeline path.

10. The arrangement of claim 1, wherein each FIFO-register includes fewer positions than instructions in the respective pipeline path.

11. The arrangement of claim 1, wherein approximately 8 instructions can be queued in each pipeline path.

12. The arrangement of claim 1, wherein each FIFO-register comprises between 2 and 4 positions for storing jump target address information.

13. The arrangement of claim 1, wherein a first pipeline path is a sequential path and a second pipeline path is a non-sequential path and when a second conditional jump instruction is found, the conditional jump target address is stored in the FIFO-register of the sequential path and if the conditional jump is not taken, the instructions of a sequential queue are executed without interruption and a non-current nonsequential pipeline path prefetches instructions using consecutive address information of the first FIFO-register of a sequential pipeline path.

14. The arrangement of claim 13, wherein through the FIFO-register arranged to a non-sequenitial path, prefetching of instructions is not interrupted by a conditional jump instruction.

15. The arrangement of claim 1, wherein if a conditional jump is not taken, the non-current path is flushed and prefetching starts using a subsequent address stored in the FIFO-register.

16. The arrangement of claim 1, wherein prefetching to a pipeline path can be done using both address information from a FIFO-register arranged for that particular path and from a FIFO-register arranged to another path.

17. The arrangement of claim 1, wherein the processing of instructions at least comprises fetching, decoding and executing of instructions.

18. The arrangement of claim 1, wherein the conditional jump target address information comprise absolute addresses.

19. The arrangement of claim 1, wherein the conditional jump target address information contained in the FIFO(s) comprises relative address information, additional storing means being provided for the real addresses.

20. The arrangement of claim 1, wherein for unconditional jumps instructions, the pipeline paths are not switched but the flow is broken and it is proceeded from a preceding jump address.

21. The arrangement of claim 1, wherein for an unconditional jump, the pipeline paths are switched.

22. The arrangement of claim 1, wherein there are separate decoders, one for each pipeline path.

23. The arrangement of claim 1, wherein there is one common decoder for a number of pipeline paths.

24. The arrangement of claim 1, further comprising a central processor of telecommunications system.

25. The arrangement of claim 1, wherein substantially sequential and continuous prefetching of instructions is enabled irrespective of the type of the jump instruction.

26. Processing arrangement in a telecommunications system comprising an arrangement for pipeline processing of instructions comprising a sequential pipeline path following a program flow sequentially and a non-sequential pipeline path, one of which is current and the other is non-current, and when conditional jump instructions are found in an instruction queue, a second pipeline prefetches and decodes the instructions starting from a jump information address, wherein a storing arrangement is provided which comprises at least first storing means in which conditional jump target address information is stored and the non-current pipeline path prefetches instructions from the conditional jump target addresses and in that if a jump is taken, then paths are switched and irrespectively of whether the jump is taken or not, the path to which information from the jump information address was prefetched is flushed, and prefetching thereto is proceeded from a subsequent address in the storing means.

27. Method for processing instructions in pipeline in a processing arrangement comprising in at least part of the pipeline two pipeline paths, said method comprising the steps of:

executing instructions in a current path, storing conditional jump address information in a storing arrangement comprising at least one FIFO-register, prefetching instructions from the conditional jump address information as given in the FIFO(s) to a non-current path, if a jump is not taken, flushing the non-current path and continuing to prefetch instructions from a subsequent address given in a FIFO of the storing arrangement, and if a conditional jump is taken, switching a current path into a non-current path and vice versa and flushing a previous current path to which prefetch is done from the FIFO-register of the storing arrangement.

28. Method for processing instructions in a pipeline in a processing arrangement wherein instructions are delivered to an instruction decoder from an instruction store, comprising the steps of:

separating instructions and conditional jump target addresses, arranging the instructions in a pipeline instruction queue, storing the conditional jump target addresses in a FIFO-register, if a conditional jump is taken, using an output address from the FIFO-register as the next instruction address in said instruction store, and flushing the FIFO-register and the instruction queue, and if a conditional jump is not taken, shifting to the next address in the FIFO-register.

* * * * *